United States Patent
Kearney et al.

(10) Patent No.: US 10,891,703 B2
(45) Date of Patent: Jan. 12, 2021

(54) PREVENTING UNAUTHORIZED USE OF PROTECTED EQUIPMENT IN VIOLATION OF EXPORT REGULATIONS

(71) Applicant: INTERNATIONAL BUSINESS MACHINES CORPORATION, Armonk, NY (US)

(72) Inventors: Daniel J. Kearney, Ulster Park, NY (US); Thomas C. Long, Poughkeepsie, NY (US); Budy Notohardjono, Poughkeepsie, NY (US); Steven J. Ahladas, Highland, NY (US); David Kumhyr, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 16/005,738

(22) Filed: Jun. 12, 2018

(65) Prior Publication Data
US 2019/0378231 A1    Dec. 12, 2019

(51) Int. Cl.
*G06Q 50/26*    (2012.01)
*G01S 19/13*    (2010.01)
*H04L 12/28*    (2006.01)

(52) U.S. Cl.
CPC .............. *G06Q 50/26* (2013.01); *G01S 19/13* (2013.01); *H04L 12/28* (2013.01)

(58) Field of Classification Search
CPC . G08B 1/08; H04M 1/66; G06F 12/02; G06F 21/00; G06F 3/06; H04Q 5/22; G06Q 50/26; G06Q 30/00; G06Q 20/00; G01S 19/13
See application file for complete search history.

(56) References Cited

U.S. PATENT DOCUMENTS

| | | |
|---|---|---|
| 5,270,937 A | 12/1993 | Link et al. |
| 5,541,845 A | 7/1996 | Klein |
| 5,751,245 A | 5/1998 | Janky et al. |
| 6,553,496 B1 | 4/2003 | Buer |
| 6,665,161 B1 | 12/2003 | Brady et al. |
| 7,210,164 B1 | 4/2007 | Jandrell |
| 7,680,590 B2 | 3/2010 | Sanqunetti |

(Continued)

FOREIGN PATENT DOCUMENTS

| | | | |
|---|---|---|---|
| CN | 1902636 A | 1/2007 | |
| CN | 103718217 A | 4/2014 | |
| WO | WO-2016095151 A1 * | 6/2016 | ............. G06F 12/16 |

*Primary Examiner* — Thanhnga B Truong
(74) *Attorney, Agent, or Firm* — Cantor Colburn LLP; Tihon Poltavets (57) ABSTRACT

Methods, systems and computer program products for preventing unauthorized use of protected equipment in violation of export regulations are provided. Aspects include periodically obtaining a location of the protected equipment and storing the location in a location log in a non-volatile memory. Upon receiving a request to operate the protected equipment, aspects also include obtaining the location log from the non-volatile memory and parsing data from the location log to determine whether the protected equipment entered a restricted geographic area. Based on a determination that the protected equipment did not enter a restricted geographic area, aspects include granting the request to operate the protected equipment.

17 Claims, 9 Drawing Sheets

(56) References Cited

U.S. PATENT DOCUMENTS

| | | |
|---|---|---|
| 7,920,066 B2 | 4/2011 | Troxler |
| 8,248,237 B2 | 8/2012 | Fitzgerald et al. |
| 8,275,358 B1 * | 9/2012 | Adelson ................. H04M 1/66 |
| | | 455/404.2 |
| 9,058,903 B2 | 6/2015 | Arsovski et al. |
| 2002/0017977 A1 | 2/2002 | Wall |
| 2003/0220835 A1 * | 11/2003 | Barnes, Jr. ........ H04M 1/72519 |
| | | 705/14.36 |
| 2008/0096529 A1 | 4/2008 | Zellner |
| 2014/0082754 A1 * | 3/2014 | Guo ....................... G06F 21/00 |
| | | 726/30 |

* cited by examiner

FIG. 9 ial systems, certain computing devices, and the like. Regulations from the United States Department of Commerce, Bureau of Industry and Security and conventions such as the Wassenaar Arrangement and International Traffic in Arms Regulations (ITAR) require diligence on the part of companies involved in exporting regulated items.

PREVENTING UNAUTHORIZED USE OF PROTECTED EQUIPMENT IN VIOLATION OF EXPORT REGULATIONS

BACKGROUND

The invention relates generally to ensuring compliance with export regulations and, more specifically, to preventing unauthorized use of protected equipment in violation of export regulations.

Compliance with export regulations is a concern for exporters of technology that is controlled by local governments, such as arms and weapons systems, cryptography systems, certain computing devices, and the like. Regulations from the United States Department of Commerce, Bureau of Industry and Security and conventions such as the Wassenaar Arrangement and International Traffic in Arms Regulations (ITAR) require diligence on the part of companies involved in exporting regulated items.

SUMMARY

According to an embodiment, a system for preventing unauthorized use of protected equipment in violation of export regulations is provided. The system includes a memory having computer readable computer instructions, and a processor for executing the computer readable instructions. The computer readable instructions include instructions for periodically obtaining a location of the protected equipment and storing the location in a location log in a non-volatile memory. Upon receiving a request to operate the protected equipment, the computer readable instructions include instructions for obtaining the location log from the non-volatile memory and parsing data from the location log to determine whether the protected equipment entered a restricted geographic area. Based on a determination that the protected equipment did not enter a restricted geographic area, the computer readable instructions include instructions for granting the request to operate the protected equipment.

According to another embodiment, a method for preventing unauthorized use of protected equipment in violation of export regulations is provided. The method periodically obtaining a location of the protected equipment and storing the location in a location log in a non-volatile memory. Upon receiving a request to operate the protected equipment, the method includes obtaining the location log from the non-volatile memory and parsing data from the location log to determine whether the protected equipment entered a restricted geographic area. Based on a determination that the protected equipment did not enter a restricted geographic area, the method includes granting the request to operate the protected equipment.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes periodically obtaining a location of the protected equipment and storing the location in a location log in a non-volatile memory. Upon receiving a request to operate the protected equipment, the method includes obtaining the location log from the non-volatile memory and parsing data from the location log to determine whether the protected equipment entered a restricted geographic area. Based on a determination that the protected equipment did not enter a restricted geographic area, the method includes granting the request to operate the protected equipment.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
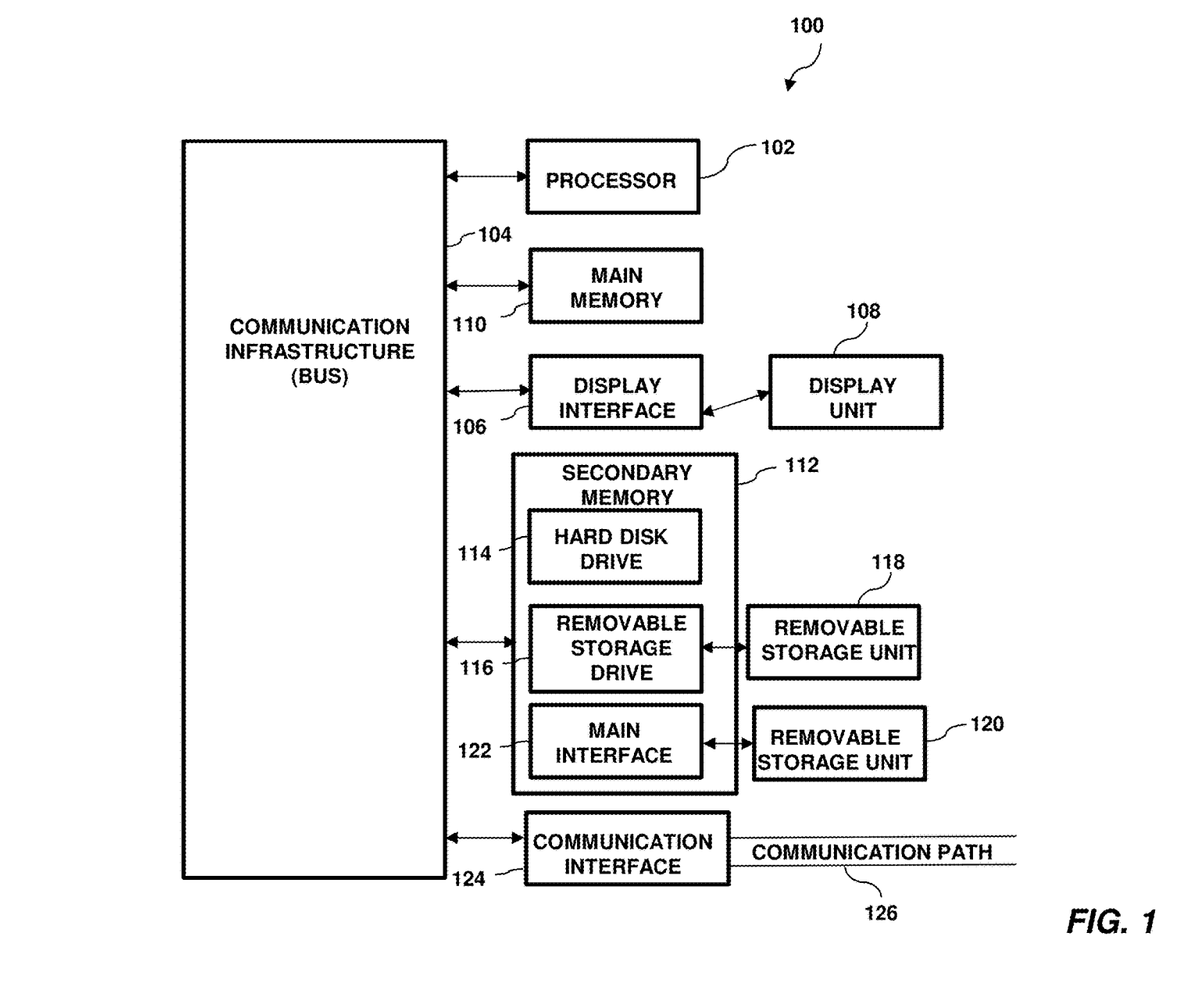
FIG. 1 depicts an exemplary computer system capable of implementing one or more embodiments of the present invention.

Turning now to a more detailed description of aspects of the present invention, FIG. 1 illustrates a high-level block diagram showing an example of a computer-based system 100 useful for implementing one or more embodiments of the invention. Although one exemplary computer system 100 is shown, computer system 100 includes a communication path 126, which connects computer system 100 to additional systems and may include one or more wide area networks (WANs) and/or local area networks (LANs) such as the internet, intranet(s), and/or wireless communication network(s). Computer system 100 and additional systems are in communication via communication path 126, (e.g., to communicate data between them).

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a Micro SD reader, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by a removable storage drive 116. As will be appreciated, removable storage unit 118 includes a computer readable medium having stored therein computer software and/or data.

In some alternative embodiments of the invention, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etc. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110, and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

In exemplary embodiments, methods, systems, and computer program products for preventing unauthorized use of protected equipment in violation of export regulations are provided. In exemplary embodiments, protected equipment, i.e., equipment that is subject to export controls, are fitted with tracking devices that are configured to track and log a shipment path of the protected equipment. The tracking devices are further configured to prevent the full function of the protected equipment if the protected equipment is located in, or has been moved through, a prohibited geography.

Figure 2:
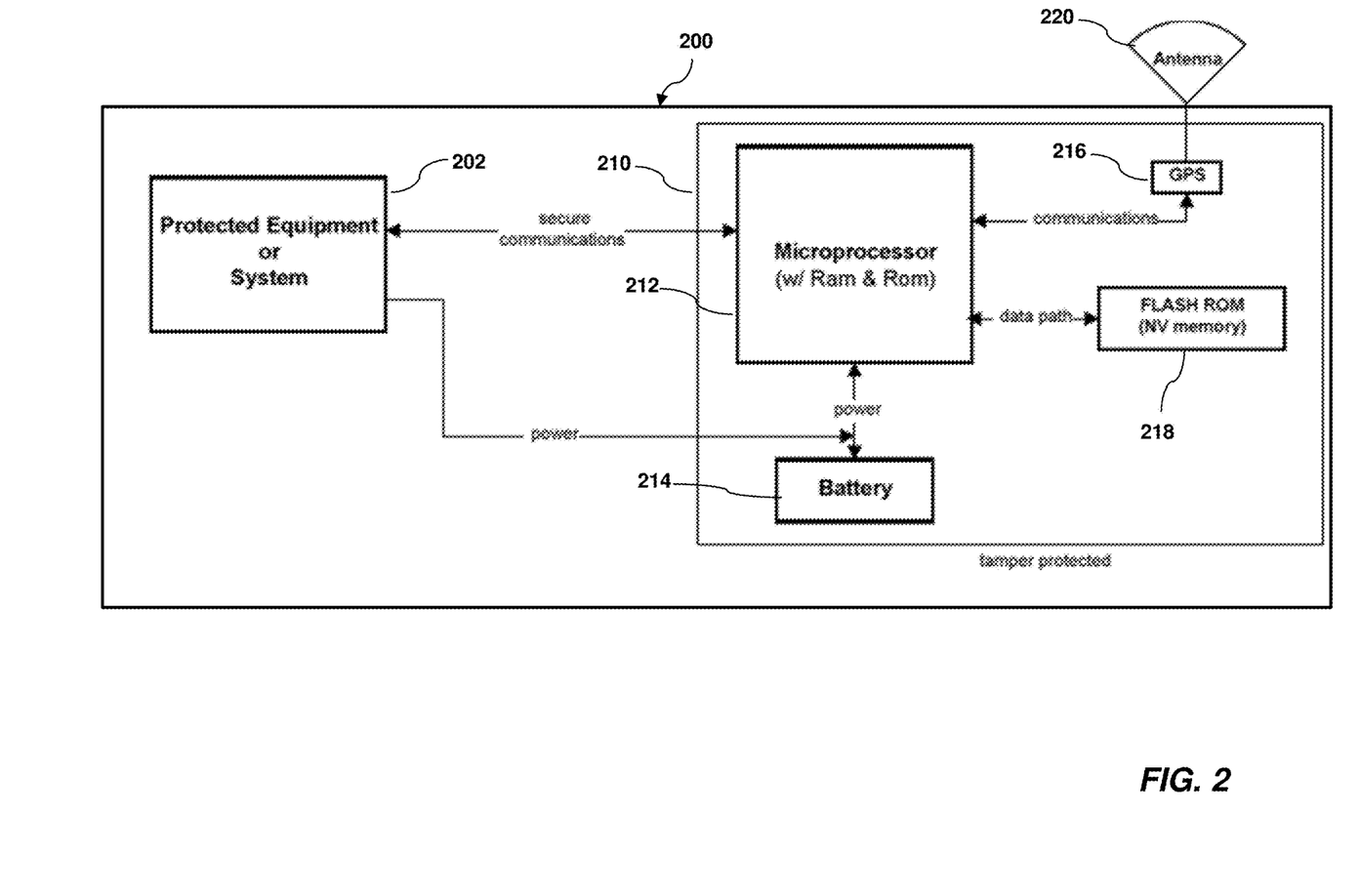
FIG. 2 depicts a system for preventing unauthorized use of protected equipment in violation of export regulations according to one or more embodiments of the present invention.

Turning now to FIG. 2, a system 200 for preventing unauthorized use of protected equipment in violation of export regulations will now be described in accordance with an embodiment. The system 200 includes a protected equipment 202 that is in secure communication with a tracking device 210. The tracking device includes a microprocessor 212, a battery 214, a non-volatile memory 218, a global positioning system (GPS) sensor 216 and an antenna 220. As illustrated, the microprocessor 212 is powered by the battery 214 and obtains location readings from the GPS sensor 216. The microprocessor 212 is configured to store location data in the non-volatile memory 218 along with timestamps for when each location was obtained. In exemplary embodiments, the tracking device 210 may be affixed to the protected equipment 202 within a tamper-evident enclosure. The tracking device 210 is configured to charge the battery 214 when the protected equipment 202 is connected to a power source.

The non-volatile memory 218 is configured to store a location log of the protected equipment 202. In exemplary embodiments, the non-volatile memory 218 has a size capable of storing a location log having approximately 60 days of tracking data at sample rate appropriate for the intended usage of the protected equipment 202. After the location log data exceeds a limit, oldest data is deleted from the track log. Faster sample rates can be required for faster moving protected equipment 202, which in turn may need larger FLASH ROM. Location logs greater than 60 days could also be attained by using larger FLASH ROMs. Alternatively, compressing location log data can be used.

In exemplary embodiments, the tracking device 210 is update-able via secure communications from the protected equipment 202 and can be accomplished only when protected equipment 202 is successfully enabled by the tracking device 210 through secure communications. In addition, new prohibited boundary data and spoofing criteria can be downloaded to the tracking device 210 when the protected equipment 202 is in a fully operational state. In exemplary embodiments, the protected equipment 202 can be a high performance computing system or land, water or air borne weapons system and movement of the protected equipment 202 into a prohibited region while powered on can result in the shutdown of the protected equipment 202. While prohibited areas or geographic regions are discussed herein as being two dimensional, it will be appreciated by those of ordinary skill in the art that the prohibited areas could be defined as three dimensional volumes as well.

Figure 3:
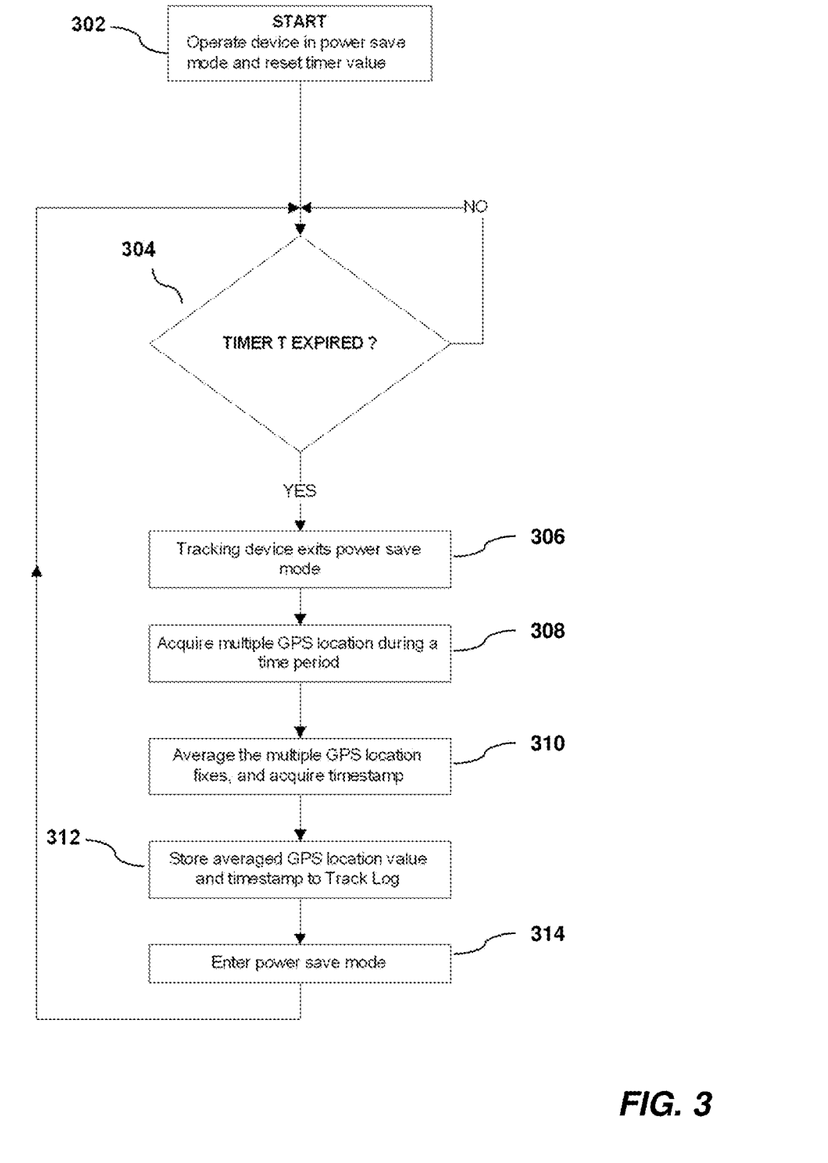
FIG. 3 depicts a flow diagram of a method for creating a location log for a piece of protected equipment according to one or more embodiments of the present invention.

Turning now to FIG. 3 a flow diagram of a method for creating a location log for a piece of protected equipment according to one or more embodiments of the present invention is shown. The method begins at block 302 with the protected equipment operating in a power saving mode and includes resetting a value of a timer. Next, as shown at decision block 304, the method includes determining if the timer has expired. If the timer has not expired, the method returns to decision block 304. Once the timer expires, the method proceeds to block 306 and the tracking device exits the power saving mode. Next, as shown at block 308, the method includes obtaining multiple GPS locations at a predetermined rate. An average location is calculated by averaging the multiple GPS locations, as shown at block 310. Next, as shown at block 312, the averaged GPS location is stored in a location log, also referred to as a tracking log, along with a time stamp indicating the time at which the GPS location was stored. The method then proceeds to block 314 and returns the tracking device to a power saving mode.

Figure 4:
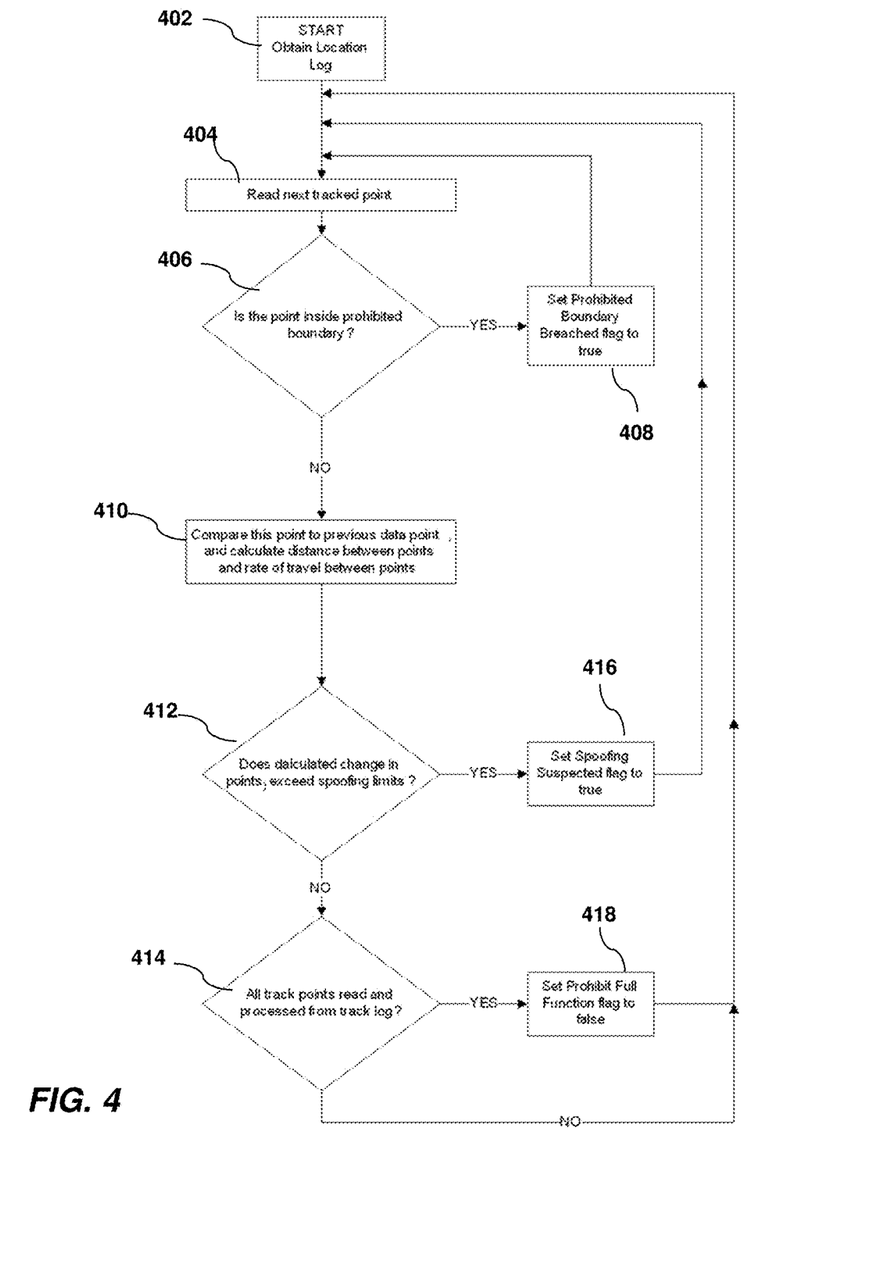
FIG. 4 depicts a flow diagram of a method for parsing a location log for a piece of protected equipment according to one or more embodiments of the present invention.

Turning now to FIG. 4 a flow diagram of a method for parsing a location log for a piece of protected equipment according to one or more embodiments of the present invention is shown. The method begins at block 402 and obtains the location log. Next, as shown at block 404, the method includes obtaining a next location from the location log. In exemplary embodiments, the locations are obtained from the location log in sequential order based on the time stamps of the stored locations. At decision block 406, the method includes determining if the location is within a restricted geographic region or boundary. In exemplary embodiments, the determination of whether the location is within a restricted geographic region is made by obtaining a polygon representing the restricted geographic region and performing a ray casting algorithm for the location and the polygon. In other embodiments, the determination of whether the location is within a restricted geographic region can be made by obtaining a fixed grid boundary representing the restricted geographic area and comparing the location to the nearest gridline of the fixed grid boundary.

If the location is within a restricted geographic region, the method proceeds to block 408 and sets a prohibited boundary breached (or crossed) flag value to true. If, as determined at decision block 406, the location is not within a restricted geographic region, the method proceeds to block 410 and compares the location to the last location captured in the location log, based on the time stamps of the locations, to determine the distance between the location and the last location. Next, as shown at decision block 412, the method determines if the calculated change in distance as a function of the change in time between the location readings exceeds a threshold value, which can be based on an expected mode of travel. In one example, the two location samples are taken five minutes apart and the distance between the locations is one hundred miles, which implies a speed of twelve hundred miles per hour. In this example, the speed of twelve hundred miles per hour would likely exceed a threshold value for any form of commercial transportation, e.g., truck, rail, and air. If the change in distance as a function of the change in time between the location readings exceeds the threshold value, the method proceeds to block 416 and sets a suspected location spoofing flag value to true. Otherwise, the method proceeds to decision block 414 and determines if all of the locations in the location log have been processed. If all of the locations in the location log have been processed, the method proceeds to block 418 and sets a prohibit full function status flag to false. Otherwise, the method returns to block 404 and process the next location in the location log. In exemplary embodiments, the prohibit full function status flag has a default value of true and is only set to false after each location in the location log has been processed.

In exemplary embodiments, the prohibited boundary breached flag, the location spoofing flag, and the prohibit full function status flag are used to prevent the protected equipment from operating in a normal manner. In exemplary embodiments, when the prohibited boundary breached flag, or the location spoofing flag has a value of true, the functionality of the protected equipment can be restricted to transmitting the location log for further analysis. Likewise, when the prohibit full function status flag has a value of true, the functionality of the protected equipment can be restricted to transmitting the location log for further analysis.

Figure 5:
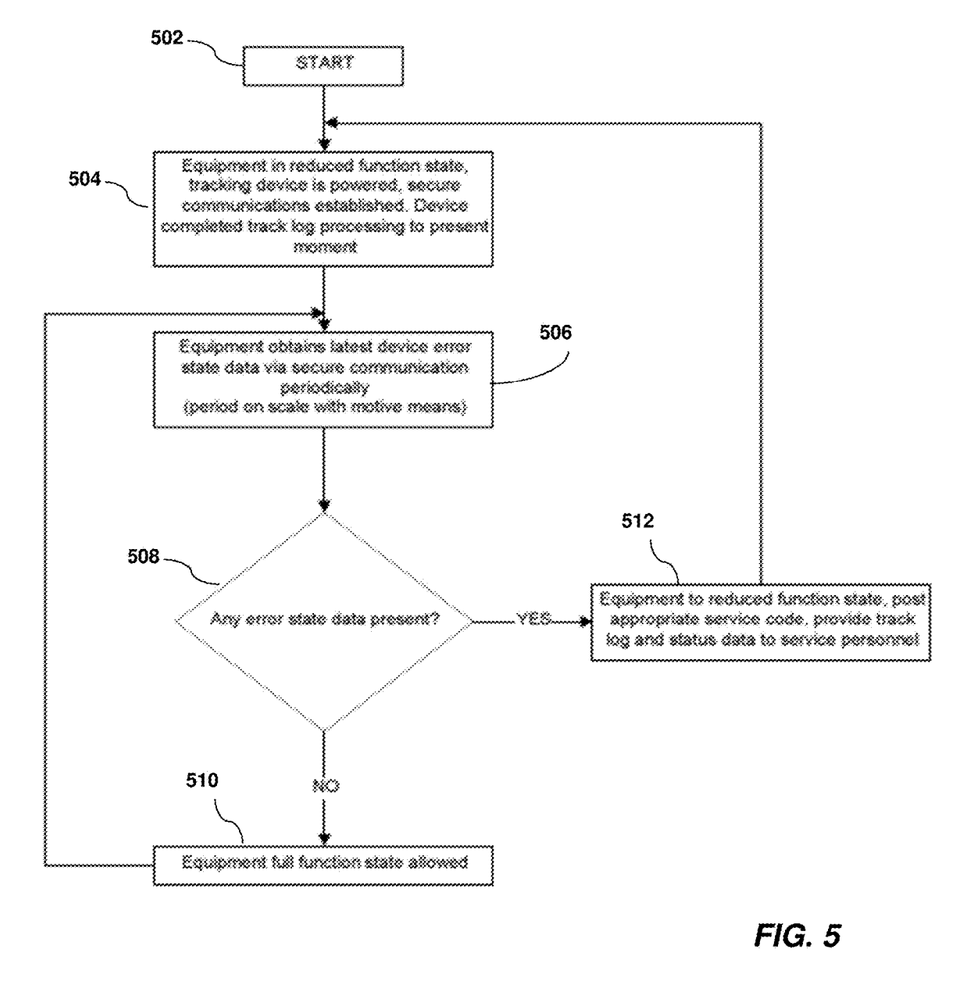
FIG. 5 depicts a flow diagram of a method for preventing unauthorized use of protected equipment in violation of export regulations according to one or more embodiments of the present invention.

Turning now to FIG. 5 a flow diagram of a method for preventing unauthorized use of protected equipment in violation of export regulations according to one or more embodiments of the present invention is shown. The method begins at block 502 with the protected equipment in a default reduced function state. Next, as shown at block 504, the method includes periodically obtaining the location of the protected equipment using a tracking device, as described in more detail with reference to FIG. 3. Next, as shown at block 506, the method includes receiving a request to operate the protected equipment and responsively processing the location log from the tracking device, as described in more detail with reference to FIG. 4. The request to operate the protected equipment can include the protected equipment being powered on. As shown at decision block 508, the method includes determining whether the operation of the protected equipment is permitted. In one embodiment, the determining whether the operation of the protected equipment is permitted includes ensuring that the prohibited boundary breached flag, the location spoofing, and the prohibit full function status flags are set to false. If the operation of the protected equipment is permitted, the method proceeds to block 510 and the protected equipment is configured to be operated in a fully functional state. Otherwise, the method proceeds to block 512 and the protected equipment is configured to be operated in a reduced functional state. In exemplary embodiments, the reduced functional state limits the functionality of the protected equipment to transmitting the location log for further analysis.

Figure 6:
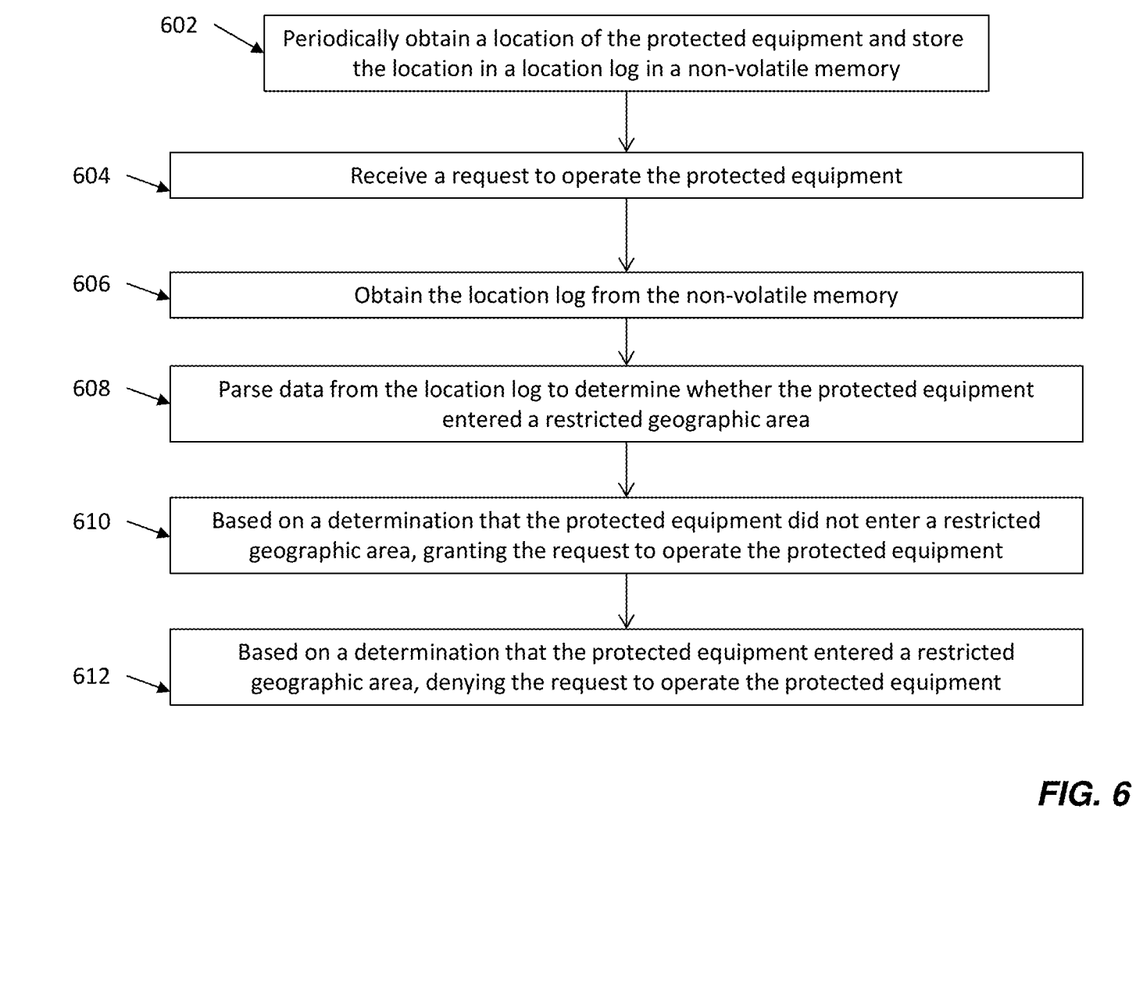
FIG. 6 depicts a flow diagram of another method for preventing unauthorized use of protected equipment in violation of export regulations according to one or more embodiments of the present invention.

Turning now to FIG. 6 a flow diagram of another method preventing unauthorized use of protected equipment in violation of export regulations according to one or more embodiments of the present invention is shown. The method includes periodically obtaining a location of the protected equipment and storing the location in a location log in a non-volatile memory, as shown at block 602. In exemplary embodiments, periodically obtaining the location of the protected equipment includes obtaining multiple readings from a global position sensor (GPS) in communication with the processor and storing an average reading from the GPS sensor in the location log as the location.

Next, as shown at block 604, the method includes receiving a request to operate the protected equipment. In response to the request to operate the protected equipment, the method obtains the location log from the non-volatile memory, as shown at block 606. Next, as shown at block 608, the method includes parsing data from the location log to determine whether the protected equipment entered a restricted geographic area. In exemplary embodiments, parsing data from the location log further includes detecting potential tampering with the protected equipment by determining a distance between sequentially obtained locations of the protected equipment stored in the location log.

In one embodiment, the determination of whether the protected equipment entered the restricted geographic area includes obtaining a polygon representing the restricted geographic area and performing ray casting to determine whether each location in the location log is within the polygon. In another embodiment, the determination of whether the protected equipment entered the restricted geographic area includes obtaining a fixed grid boundary representing the restricted geographic area and comparing each location in the location log to the nearest gridline of the fixed grid boundary. The nearest gridline of the fixed grid boundary is selected by identifying a gridline of the fixed grid boundary that has a longitude value closest to a longitude value of the location.

Based on a determination that the protected equipment did not enter a restricted geographic area, the method includes granting the request to operate the protected equipment, as shown at block 610. Based on a determination that the protected equipment entered a restricted geographic area, the method includes denying the request to operate the protected equipment, as shown at block 612. In exemplary embodiments, when the request is denied, the location log can be transmitted to another processing system for additional analysis.

Figure 7:
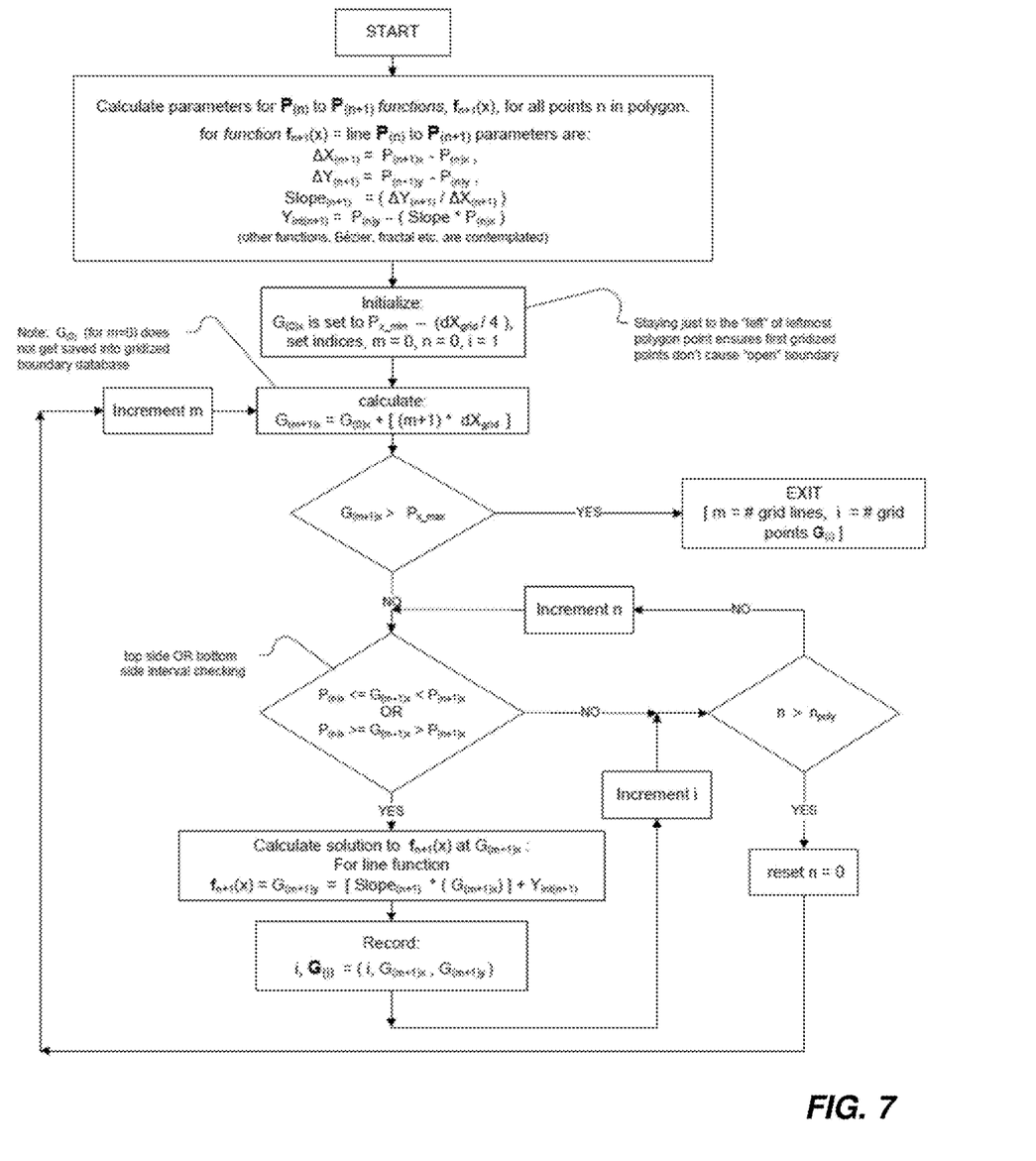
FIG. 7 depicts a flow diagram of a method for calculating a fixed grid boundary representing the restricted geographic area from a polygon representing the restricted geographic area according to one or more embodiments of the present invention.

In exemplary embodiments, the determination of whether the protected equipment entered the restricted geographic area includes obtaining a fixed grid boundary representing the restricted geographic area and comparing each location in the location log to the nearest gridline of the fixed grid boundary. As used herein the term gridizing refers to the process of creating a fixed grid boundary representing the restricted geographic area from a polygon representing the restricted geographic area. The fixed grid boundary representing the restricted geographic area can be represented as $P_{(n)}=(P_{(n)x}, P_{(n)y})$. Where $P_{(n)x}$ is longitude or x value at $P_{(n)}$ and $P_{(n)y}$ is latitude or y value at $P_{(n)}$. It will be appreciated by those of ordinary skill in the art that the convention of longitude as x and latitude as y for points nomenclature is solely for convenience and that reversing and having longitude as y and latitude as x could be used. Based on the polygon $P_{(n)}$, gridized points $G_{(m)}=(G_{(m)x}, G_{(m)y})$ can be calculated. For example, Let $P_{(0)}$ be "leftmost" point in given kml polygon (point with lowest x or longitude value=$P_{(0)x}$), the rightmost point would, therefore, be point with highest longitude value, call this point $P_{(r)}$ ($P_{(r)x}$ is highest longitude value in polygon data). $n_{poly}$ is the number of total polygon points in the given kml polygon and $dX_{grid}$ is set based on error value desired=err. The number of gridlines is: $[(P_{(r)x}-P_{(0)x})/dX_{grid}]$ and $G_{(0)x}$ is set to $P_{(0)x}-(dX_{grid}/4)$. FIG. 7 illustrates a flow diagram of one method for calculating a fixed grid boundary representing the restricted geographic area from a polygon representing the restricted geographic area, where x values for min and max boundary points ($P_{x\_min}=P_{(0)x}$, $P_{x\_max}=P_{(r)x}$), $n_{poly}$=number polygon points, and desired error, $dX_{grid}$. The gridizing method shown uses the function of a simple line of y=mx+b between two given kml vertices. It will be apparent to those of ordinary skill in the art that other functions, such as Bézier, fractal etc, may produce a better representation of a boundary other than a line function between given vertex points from original .kml data. Other functions particularly fractal may better fill in where projected gridized points should fall.

Figure 8:
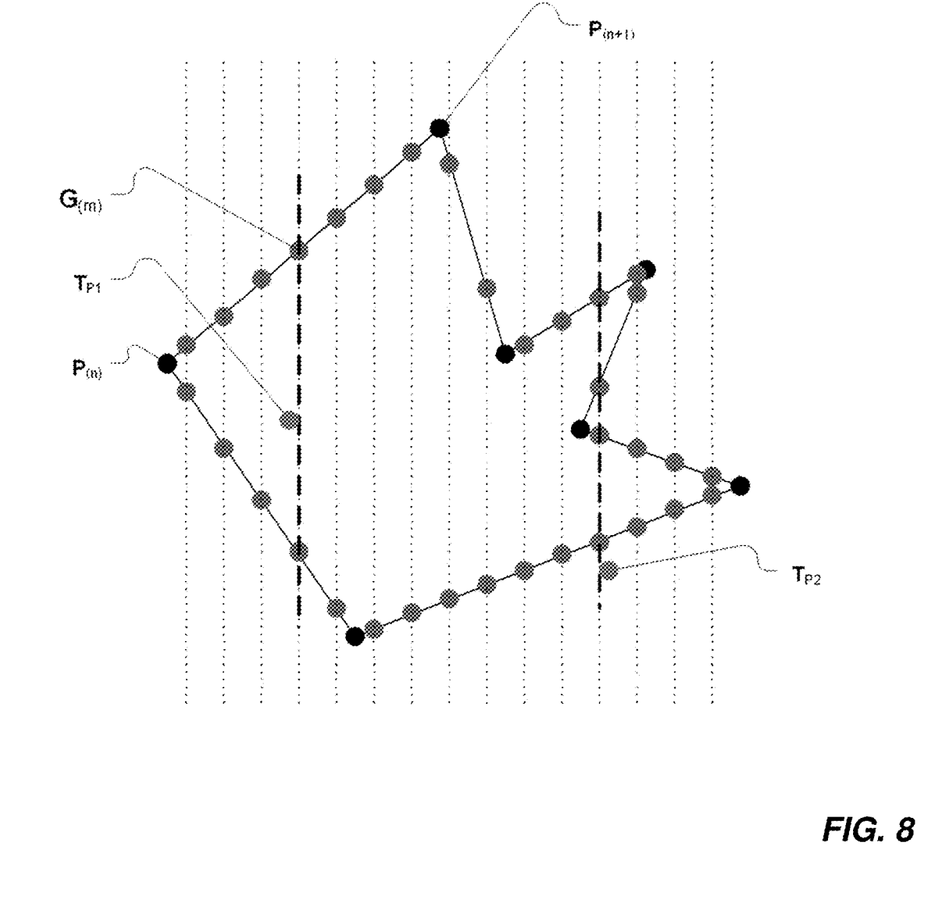
FIG. 8 depicts an illustration of a fixed grid boundary representing a restricted geographic area according to one or more embodiments of the present invention.

As shown in FIG. 8, gridized points, $G_{(m)}$, are sorted in ascending order by $G_{(m)x}$ (longitude values). Testing a given GPS location fix, $T_P$, involves rounding up or down $T_{Px}$ longitude value to nearest gridline value $G_{(m)x}$ and counting the number of $G_{(m)y}$ latitude values are greater than $T_{Py}$ only at this $G_{(m)x}$. If the answer is odd then IN boundary if the answer is even then OUT of boundary. This method is similar to traditional ray casting up but it only requires that test locations be evaluated at the nearest gridline, i.e., $T_{Px}$ is rounded to $G_{(m)x}$. As a result, this method does not require evaluating all vertices of the polygon for each test $T_P$ location, therefore.

Figure 9:
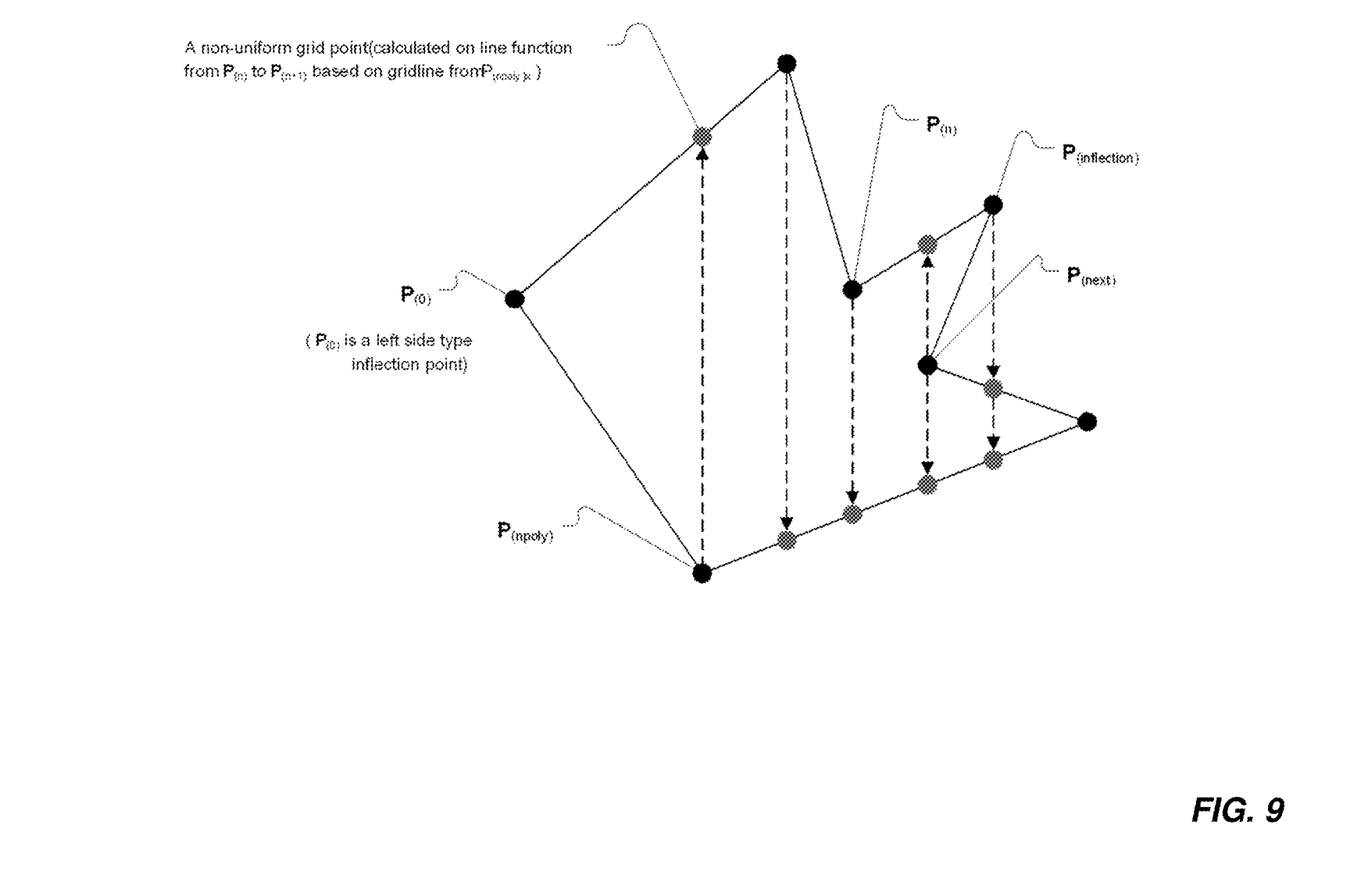
FIG. 9 depicts an illustration of another fixed grid boundary representing the restricted geographic area according to one or more embodiments of the present invention.

In another embodiment, as shown in FIG. 9, gridizing using only the original polygon vertices, which results in non-uniform gridlines, can be performed. By using only fixed grid lines, the computing power required to check location $T_{(GPS)}$ to the nearest gridline value is reduced. The polygon representing the geographic area may have an arbitrary number of vertices such that there are not even numbers of boundary values for any given vertex x value. By gridizing on gridlines defined by the original vertices only (using the method shown for gridizing on uniform grid but with gridlines at $P_{(n)x}$ values) even numbers of grid points for any given $P_{(n)x}$ value (except for left or right inflection vertices are created. In exemplary embodiments, inflection points can be handled by making the inflection point into two points with same longitude value as original point but using latitude values of that of the original but plus and minus a small error in line with dXgrid error. There must be even numbers of grid points for any given gridline including at an inflection point for ray casting method at fixed gridlines to yield proper boundary testing.

Multi-polygon databases for many national boundaries are currently commercially available in .kmz, .kml or various other formats (@www.gadm.org). As an example, the size of one ITAR (or Wassennar) restricted national boundary is 3.75 MB consists of 209 polygons and approximately 110,000 vertices. Boundary databases, therefore, are not a large memory penalty. Curation of boundary databases to desired error limits are therefore reasonable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for monitoring and reporting export control violations for a protected equipment, comprising:
   a memory having computer readable instructions; and
   a processor for executing the computer readable instructions, the computer readable instructions including instructions for:
   periodically obtaining a location of the protected equipment and storing the location in a location log in a non-volatile memory;
   upon receiving a request to operate the protected equipment:
      obtaining the location log from the non-volatile memory;
      parsing data from the location log to determine whether the protected equipment entered a restricted geographic area; and
   based on a determination that the protected equipment did not enter a restricted geographic area, granting the request to operate the protected equipment,
   wherein parsing data from the location log further includes detecting potential tampering with the protected equipment by determining a distance between sequentially obtained locations of the protected equipment stored in the location log.

2. The system of claim 1, wherein periodically obtaining the location of the protected equipment includes obtaining multiple readings from a global position sensor (GPS) in communication with the processor and storing an average reading from the GPS sensor in the location log as the location.

3. The system of claim 1, wherein the determination of whether the protected equipment entered the restricted geographic area includes obtaining a polygon representing the restricted geographic area and performing ray casting to determine whether each location in the location log is within the polygon.

4. The system of claim 1, wherein the computer readable instructions also including instructions for denying the request to operate the protected equipment based on a determination that the protected equipment entered the restricted geographic area.

5. The system of claim 1, wherein the computer readable instructions also including instructions for transmitting the location log based on a determination that the protected equipment entered the restricted geographic area.

6. The system of claim 1, wherein the determination of whether the protected equipment entered the restricted geographic area includes obtaining a fixed grid boundary representing the restricted geographic area and comparing each location in the location log to a nearest gridline of the fixed grid boundary.

7. The system of claim 6, wherein the nearest gridline of the fixed grid boundary is selected by identifying a gridline of the fixed grid boundary that has a longitude value closest to a longitude value of the location.

8. A method for preventing unauthorized use of protected equipment in violation of export regulations comprising:
   periodically obtaining a location of the protected equipment and storing the location in a location log in a non-volatile memory;
   upon receiving a request to operate the protected equipment:
      obtaining the location log from the non-volatile memory;
      parsing data from the location log to determine whether the protected equipment entered a restricted geographic area; and
   based on a determination that the protected equipment did not enter a restricted geographic area, granting the request to operate the protected equipment,
   wherein parsing data from the location log further includes detecting potential tampering with the protected equipment by determining a distance between sequentially obtained locations of the protected equipment stored in the location log.

9. The method of claim 8, wherein periodically obtaining the location of the protected equipment includes obtaining multiple readings from a global position sensor (GPS) and storing an average reading from the GPS sensor in the location log as the location.

10. The method of claim 8, wherein the determination of whether the protected equipment entered the restricted geographic area includes obtaining a polygon representing the restricted geographic area and performing ray casting to determine whether each location in the location log is within the polygon.

11. The method of claim 8, further comprising denying the request to operate the protected equipment based on a determination that the protected equipment entered the restricted geographic area.

12. The method of claim 8, further comprising transmitting the location log based on a determination that the protected equipment entered the restricted geographic area.

13. The method of claim 8, wherein the determination of whether the protected equipment entered the restricted geographic area includes obtaining a fixed grid boundary representing the restricted geographic area and comparing each location in the location log to a nearest gridline of the fixed grid boundary.

14. The method of claim 13, wherein the nearest gridline of the fixed grid boundary is selected by identifying a gridline of the fixed grid boundary that has a longitude value closest to a longitude value of the location.

15. A computer program product comprising a computer readable storage medium having program instructions embodied therewith the program instructions executable by a computer processor to cause the computer processor to perform a method, comprising:
   periodically obtaining a location of a protected equipment and storing the location in a location log in a non-volatile memory;
   upon receiving a request to operate the protected equipment:
      obtaining the location log from the non-volatile memory;

parsing data from the location log to determine whether the protected equipment entered a restricted geographic area; and based on a determination that the protected equipment did not enter a restricted geographic area, granting the request to operate the protected equipment, wherein parsing data from the location log further includes detecting potential tampering with the protected equipment by determining a distance between sequentially obtained locations of the protected equipment stored in the location log.

16. The computer program product of claim 15, wherein periodically obtaining the location of the protected equipment includes obtaining multiple readings from a global position sensor (GPS) in communication with the processor and storing an average reading from the GPS sensor in the location log as the location.

17. The computer program product of claim 15, wherein the determination of whether the protected equipment entered the restricted geographic area includes obtaining a polygon representing the restricted geographic area and performing ray casting to determine whether each location in the location log is within the polygon.

* * * * *